Figure 1:
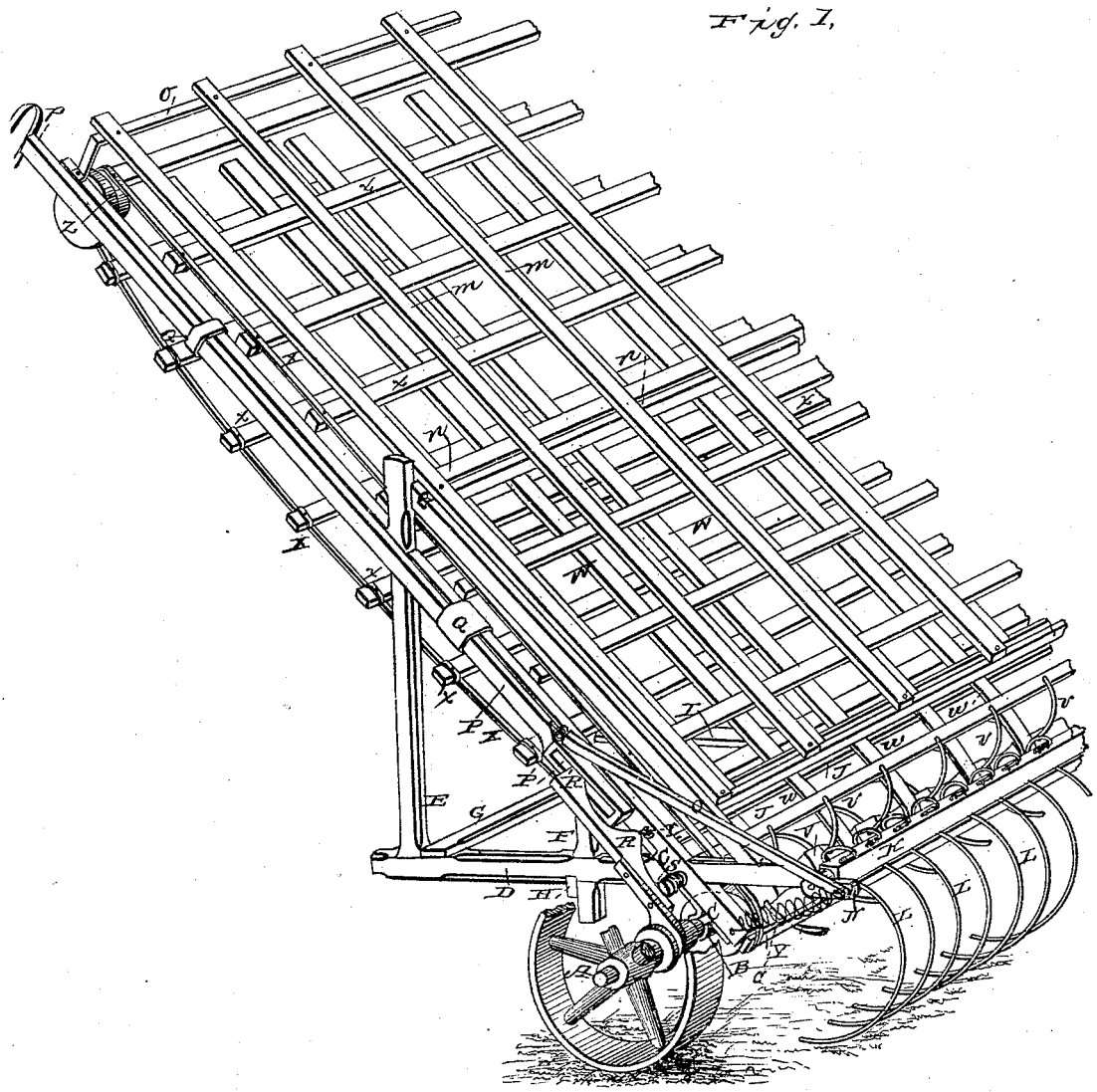

(No Model.)  C. H. FOX.  2 Sheets—Sheet 1.
HAY LOADER.

No. 271,055.  Patented Jan. 23, 1883.

WITNESSES:
Fred. G. Dieterich
Charles H. Baker

Charles Henry Fox
INVENTOR.
by Louis Bagger & Co
ATTORNEYS.

(No Model.) 2 Sheets—Sheet 2.
C. H. FOX.
HAY LOADER.
No. 271,055. Patented Jan. 23, 1883.
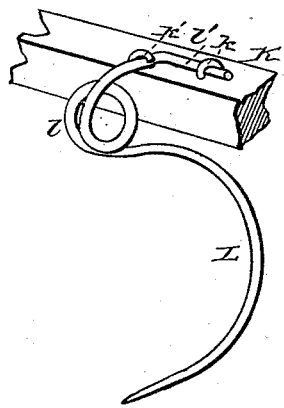
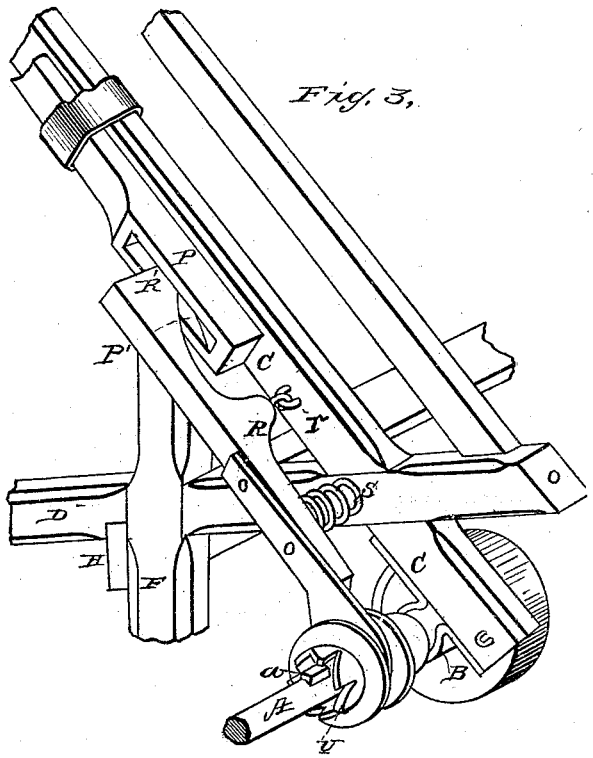
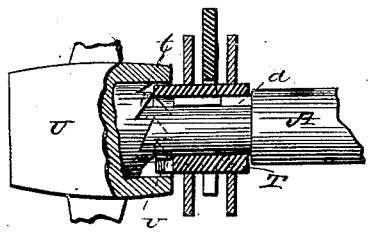
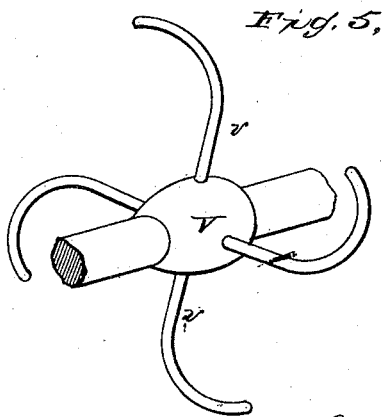
WITNESSES:
Fred. G. Dieterich
Charles H. Bodies
Charles Henry Fox,
INVENTOR.
by Louis Bagger & Co.
ATTORNEYS.

UNITED STATES PATENT OFFICE.

CHARLES H. FOX, OF WINNEBAGO CITY, MINNESOTA.

HAY-LOADER.

SPECIFICATION forming part of Letters Patent No. 271,055, dated January 23, 1883.

Application filed October 6, 1882. (No model.)

*To all whom it may concern:*

Be it known that I, CHARLES H. FOX, of Winnebago City, in the county of Faribault and State of Minnesota, have invented certain new and useful Improvements in Hay-Loaders; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of one half of my improved hay-loader with part of one of the wheels broken away, the other half being exactly alike; and Figs. 2, 3, 4, and 5 are detail views.

Similar letters of reference indicate corresponding parts in all the figures.

My invention has relation to hay rakes and loaders; and it consists in the improved construction, combination, and arrangement of parts, as hereinafter more fully described and claimed.

In the accompanying drawings, the letter A indicates the axle, hung in bearings B of the two side pieces, C.

D, E, and F are braces forming the two sides of the loader, and connected by cross-pieces G and H, to which the draw-bar I is fastened, by which the machine is attached to the wagon to be loaded.

J is a cross-piece, which connects the two side pieces, C, and supports the slat bottom, over which the hay is carried by the elevator.

K is the rake-head, to which the spring-teeth L are fastened. These teeth are made of spring-steel, and to increase their springiness are turned spirally at the part $l$, near the head. The part $l'$, that is to be fastened to the rake-head, is bent at a right angle to the spring, and its outer free end is inserted through an eye, $k$, on the rake-head. A turn-button or hook, $k'$, also fastened on the rake-head, clasps the straight part of the tooth and holds it fast to the head, as shown in Fig. 2, so that it may be removed in an instant and another tooth inserted in case one of the teeth should break. The rake-head turns in bearings on the projecting ends of the braces D, and is provided with two cranks, N, one on each end. Two spiral springs, $c$, are fastened to the ends of the side pieces, C, and to the cranks, and serve by their tension to hold the rake down when it is in that position, and when the crank is turned over, lifting the rake-head from the ground, the end of the crank where the spring is fastened will again be in such a position as to allow the tension of the spring to hold it in that position. Lifting-rods or pitmen O are hinged to the cranks and to the sliding rods P, and turn the rake-head, and consequently lift or drop the teeth when the rods are drawn up or pushed down. The rods P slide in bearings Q on the sides C, and have handles $p$ at their upper ends to operate them. At their lower ends the sliding rods P are slotted, as shown at P', for the reception of the free end of the lever R, which throws the elevating apparatus in and out of action. The outer side of this lever is straight, while the inner side is cut off obliquely, forming a wedge-shaped head, R', on the free end of the lever, which fits into the slot P' of the sliding rod P. The lever is hinged to and has its fulcrum at $r$ on the side piece, and a spring, S, fastened on the side piece, holds its free end in the slot by pressing the other end out, which straddles the clutch-coupling on the axle of the machine. This lever and part of the sliding bar are more fully illustrated in Fig. 3 of the drawings.

The coupling by which the axle may be thrown in or out of gear is shown in detail in Fig. 4 of the drawings, and consists in a sliding sleeve, T, which turns with the axle and slides on it. The axle A has a key, $a$, fastened on it, which fits into a longitudinal recess in the sleeve T. On the outer end of the sleeve are cut ratchet-teeth $t$, fitting into ratchet-teeth $u$, cut into the box of the wheel U, and by the sleeve being moved to either side by the end of lever R straddling between two annular ledges on sleeve T, the machine may be thrown in or out of gear.

It will be seen that by drawing the sliding bar P up the outer end of it will operate against the oblique side of the lever R, and thus slide the sleeve toward the machine, disengaging the ratchet-teeth, while at the same time it lifts the rake-teeth from the ground through the pitman O. When it is desired to throw the machine into gear again, the sliding rod is pushed down, which lets the rake-teeth down and allows the free end of the lever to enter the groove P' by the action of the spring S, which slides the sleeve and its ratchet-teeth toward the wheel and engages them.

To remove the hay from the rake and bring it upon the elevator, the axle A is provided with pronged sleeves, as shown in detail in Fig. 5 of the drawings. These sleeves are fastened on the axle and revolve with it, and consist of a body, V, and four or more curved prongs, v, fitting in between the slats of the hay-carrier, and operating to take the hay from the rake and place it on the carrier.

W is a floor of slats, over which the hay carrier or elevator passes, and the slats are provided with curved metal strips or bars w at their lower ends, which pass around the axle between the revolving prongs and prevent any hay from passing under the elevator.

The elevator consists of two endless chains, X, passing over two pulleys, Y, on the axle, and two guide-pulleys, Z, at the upper end of the machine. To the links of the chains are fastened slats x at sufficient distance from each other to allow the prongs v to pass between them.

Over the elevator is fastened a series of light slats, m, fastened together by cross-slats n, and by a piece of band-iron, o, at the top of the machine, which serves as a "wind-brake"— that is, to prevent the wind from blowing the hay off from the elevator.

From the foregoing description, taken in connection with the accompanying drawings, the operation of my machine will be easily understood without further explanation. It will be seen that it can be fastened to the hind end of a wagon, and the man who is on the wagon has perfect control over the machine by simply manipulating the sliding rods P, which may have two handles or be connected by one common handle.

Having thus described my invention, I claim and desire to secure by Letters Patent of the United States—

1. In a combined hay rake and loader, the combination of the sliding rod P, having recess P' at its lower end, clutch-lever R, having beveled head R', actuated by spring S and operating the clutch, and pitman O, hinged to sliding rod P and operating the rake-head, substantially as shown and set forth.

2. In a hay loader and rake, the combination of sliding rod P, clutch-lever R, and pitman O with the frame C D E F G H, having guide-pulleys Z, axle A, having drive-pulleys Y, elevator X x, clutch T V, and rake K L, substantially as and for the purpose shown and set forth.

In testimony that I claim the foregoing as my own I have hereunto affixed my signature in presence of two witnesses.

CHARLES HENRY FOX.

Witnesses:
ANDREW C. DUNN,
A. L. FOX.